UNITED STATES PATENT OFFICE.

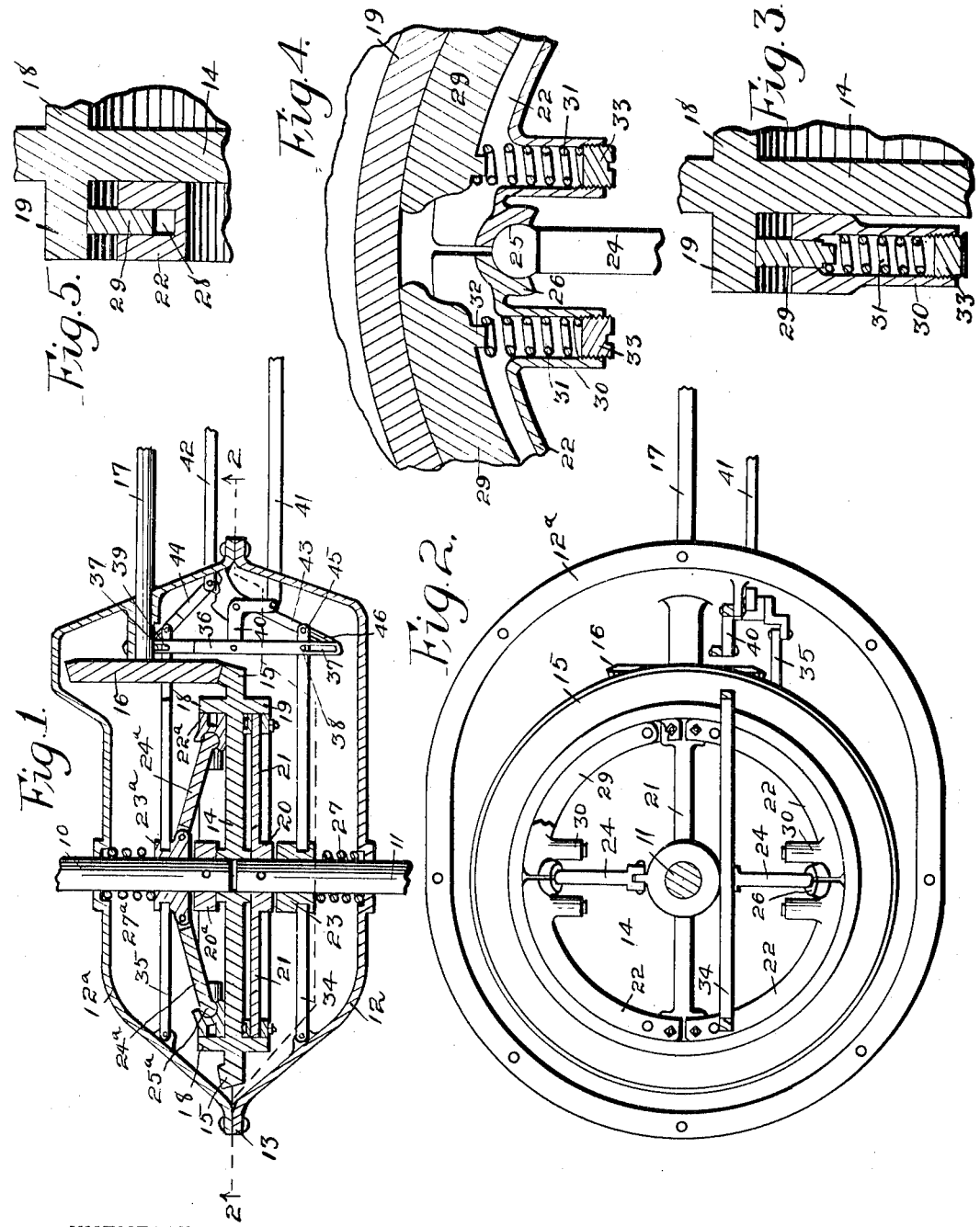

HANS SCHLICHT, OF WALNUT, IOWA.

CLUTCH.

1,107,710.　　　Specification of Letters Patent.　　Patented Aug. 18, 1914.

Application filed March 17, 1913. Serial No. 755,023.

*To all whom it may concern:*

Be it known that I, HANS SCHLICHT, a citizen of the United States, residing at Walnut, in the county of Pottawattamie and State of Iowa, have invented a certain new and useful Clutch, of which the following is a specification.

The object of my invention is to provide a clutch which will serve the purpose both of a clutch and of a differential, and which may be used in any kind of a motor vehicle, but is more especially designed for use with motor plows.

A further object is to provide a clutch arranged also to serve as a differential, which device belongs to the type employing friction shoes.

A further object is to provide in such a device, as above mentioned, a double friction shoe so constructed and arranged that the friction surface of the shoe may be applied gradually by yielding pressure.

A further object is to provide simple and effective means for controlling the friction shoes of my improved clutch.

My invention consists in certain details, in the construction, arrangement and combination of the various parts of the device, whereby the objects contemplated are attained, as hereinafter more fully set forth, pointed out in my claims, and illustrated in the accompanying drawings, in which:

Figure 1 shows a horizontal, sectional view through a clutch embodying my invention. Fig. 2 shows a vertical, sectional view of the same taken on the line 2—2 of Fig. 1. Fig. 3 shows a transverse, sectional view through one of the friction shoes of my clutch and adjacent mechanism. Fig. 4 shows a sectional, detail view taken at right angles to the view shown in Fig. 3, and Fig. 5 shows another sectional view through one of the friction shoes of my improved clutch.

In the accompanying drawings, I have used the reference numerals 10 and 11 to indicate the two parts of a divided shaft. The parts 10 and 11 of the shaft are suitably mounted in a casing 12 which is provided with flanges 13 which may be bolted together. The parts 10 and 11 are of course in alinement and their inner ends are adjacent to each other, as shown in Fig. 1. The shaft parts 10 and 11 may be operatively connected with the traction wheels of a vehicle in any desired way.

Loosely mounted upon the inner ends of the shaft parts 10 and 11 is a wheel 14 preferably solid having formed at its outer edge a beveled gear 15 in mesh with a beveled gear 16 on the shaft 17. The shaft 17 may be operated from an engine or any suitable source of power. Near the outer edge of the wheel 14, said wheel is provided with opposite annular flanges 18 and 19.

On the shaft member 11 is fixed a hub 20 from which extend opposite arms 21 which are pivoted at their outer ends to curved friction shoes 22. Loosely mounted on the shaft member 11, outside the hub 20 is a collar 23, to the opposite sides of which are pivoted links or arms 24. The outer end of each arm 24 forms a ball 25 which is received in a socket 26. The socket 26 is made in two halves, one half being formed in the end of the friction shoe 22 which is pivoted to one of the arms 21, and the other half being formed in the adjacent end of another of the friction shoes 22 pivoted to the other arm 21. It will thus be seen that there is pivoted to the outer end of each arm 21, two friction shoes 22 and that the outer end of each arm 24 is pivotally connected by means of the ball 25 and socket 26 with the ends of two of the friction shoes 22, as clearly shown in Fig. 2. The friction shoes 22 are designed, in the outward position of their movement, to engage the inner surface of the flange 19. I provide similar mechanism on the shaft member 10, the parts being designated by the same numerals already used with the addition of the small *a*.

Between the collar 23 and the casing 12 is an expansible coil spring 27 and between the collar 23$^a$ and the casing 12 is an expansible coil spring 27$^a$. Each of the friction shoes 22 and 22$^a$ is provided with a longitudinal slot 28. Pivoted in the slots 28, adjacent to the arms 21 and 21$^a$ respectively, are shoe members 29. Formed on the shoes 22 and 22$^a$, on the inner suface thereof adjacent to the free ends of the shoe members 29, are inwardly extending cylinders 30 in which are mounted expansible coil springs 31, the outer ends of which receive lugs 32 on the shoe members 29 and the inner ends of which are engaged by screw plugs 33 mounted in the ends of the cylinders 30.

For sliding the collars 23 and 23ª upon the shaft members 11 and 10, and thereby controlling the friction shoe mechanism, I have provided the following means: A lever 34 is pivoted upon the casing 12 and is operatively connected with the collar 23 for sliding the same while permitting said collar to rotate freely on the shaft member 11. A similar lever 35 is pivoted to the casing and is similarly connected to the collar 23ª. At what I shall call the forward end of the levers 34 and 35, I have provided a transverse arm or bar 36 having in each end an elongated slot 37. Pins 38 and 39 respectively are mounted in the slots 37, as shown in Fig. 1. Suitably mounted within the casing 12 is a bell crank lever 40, one arm of which is pivoted to the middle of the bar 36. Pivoted to the other arm of the bell crank lever 40 is a link 41 which passes through the casing 12 and may be connected with the steering gear or the front wheel of a motor driven vehicle, or may be operated in any suitable and desirable manner. The bar 36 and the slots 37 therein are so constructed that the pins 38 and 39 are normally at the inner ends of said slots. It will be seen that by moving the link 41 longitudinally either of the cams 23 or 23ª may be moved away from the wheel 14, thereby drawing the friction shoes on the one side or on the other side of said wheel out of engagement with the flange 19 or 18 as the case may be. Extending through the casing 12, I have provided another link 42 and pivoted to the end thereof within said casing are links 43 and 44. A pin 45 secured to the lever 34 is slidably mounted in an elongated slot 46 in the outer end of the link 43. The link 44 is similarly mounted on the lever 35 by means of a similar pin and slot. The pins 45 normally rest at the inner ends of the slots 46 so that when the link 42 is moved toward the shaft members 10 and 11, both the levers 34 and 35 will be moved outwardly and the friction shoes on both sides of the wheel 15 will be thrown out of engagement with the flanges 19 and 18.

In the practical operation of my improved clutch, the shaft 17 is operated from any suitable source of power and therefore the gears 16 and 15 rotate the wheel 14. Insomuch as the springs 27 and 27ª normally press the collars 23 and 23ª inwardly the friction shoes are normally in engagement with the flanges hereinbefore described. The strength of the springs 27 and 27ª is sufficient to overcome the resiliency of the springs 31 so that shoe members 29, 22 and 22ª are normally held in frictional engagement with the flanges 19 and 18. It will readily be seen that, if the link 41 is connected with the steering gear of a motor driven vehicle or with the front wheels thereof, my clutch device may serve the purpose of a differential gear. Assuming that the shaft member 10 is operatively connected with the friction wheel which travels the greater distance when the machine on which my device is mounted is making a turn, and assuming that the link 41 is so operated as to be drawn longitudinally away from the casing 12, then the lever 34 will be moved outwardly, thereby sliding the collar 23 on the shaft member 11 away from the wheel 14 against the pressure of the spring 27. The arms 24 will be drawn away from the wheel 14 and the friction shoes 22 and the shoe members 29 carried thereby will be drawn out of engagement with the flange 19. The result will be that the wheel of the vehicle operatively connected with the shaft member 10 will be driven from the engine and will carry the vehicle forwardly. For turning in the opposite direction, the link 41 is moved toward the casing 12 and the result will be the release of the friction shoes 22ª, thereby permitting the shaft member 10 to rotate less rapidly than the shaft member 11. By moving the link 42 longitudinally toward the casing 12, the friction shoes on both sides of the wheel 14 may be moved out of engagement with the flanges on said wheel and the shaft members 10 and 11 thereby thrown out of gear with relation to the shaft 17.

Where my improved clutch is used, the ordinary differential may be entirely dispensed with. My device combines the functions of the differential and the clutch. It is of comparatively simple and durable construction and may be readily used with any form of motor vehicle although I have especially designed it for use on motor plows.

I claim as my invention:

1. In a device of the class described, a support, shaft members mounted thereon in alinement with each other, a wheel loosely mounted on the adjacent ends of said shaft members, means for operating said wheel, oppositely extending annular flanges on said wheel, friction shoes carried by each of said shaft members and designed to coact with the respective flanges thereon, means for throwing the friction shoes into or out of engagement with either of said flanges, and means for throwing said frictional shoes simultaneously out of engagement with said flanges.

2. In a device of the class described, a shaft, a wheel thereon, said wheel being provided with an annular flange, friction shoes carried by said shaft, means for moving said friction shoes into or out of engagement with said flange, each of said shoes comprising a body designed to engage and coact with said flange, said body being provided with a longitudinal slot, a shoe member within said slot pivotally mounted at one end of said shoe, and yielding means for holding the free end of said shoe member at the outward limit of its movement.

Des Moines, Iowa, February 20, 1913.

HANS SCHLICHT.

Witnesses:
M. WALLACE,
H. ANDERSON.